Nov. 18, 1958 G. W. DANNER 2,861,127
PARTY LINE TELEPHONE ANSWERING ACTUATOR
Filed Oct. 12, 1953
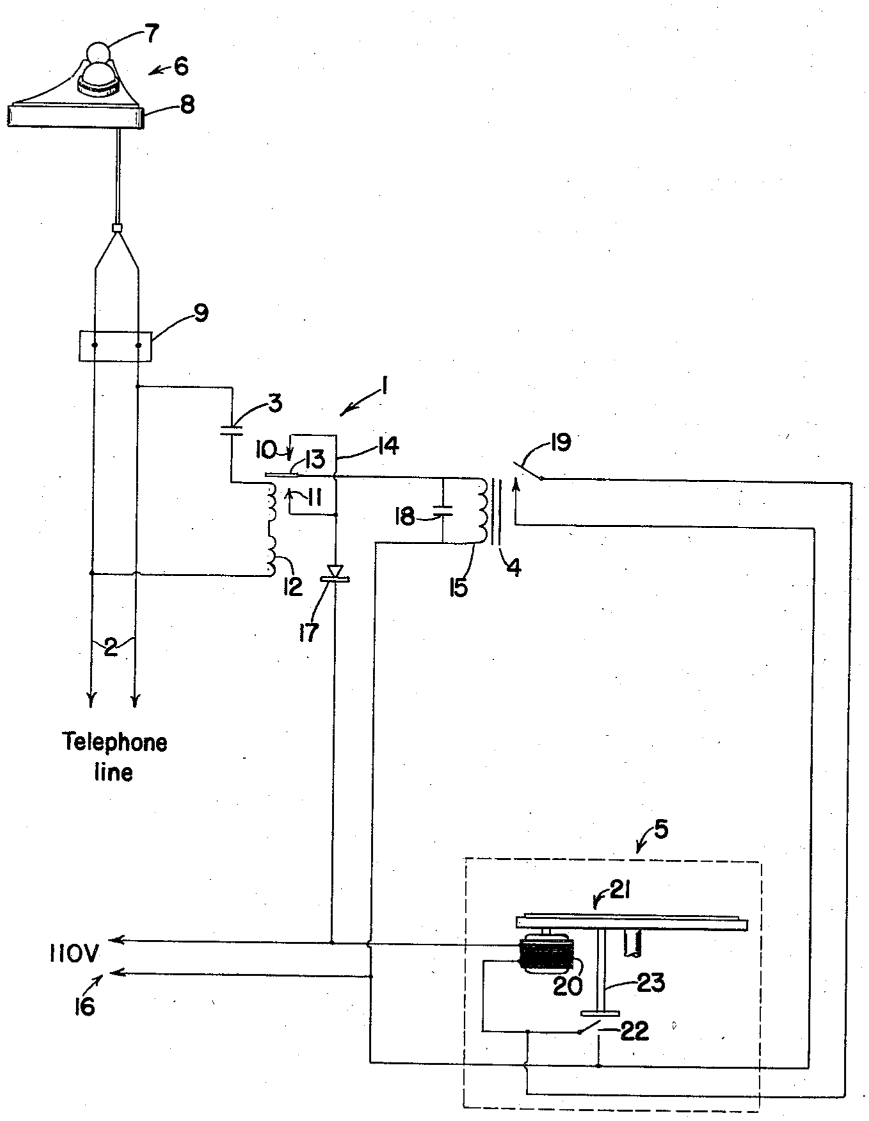
INVENTOR.
GEORGE W. DANNER
BY Andrus & Sceales
Attorneys

1

2,861,127

PARTY LINE TELEPHONE ANSWERING ACTUATOR

George W. Danner, Milwaukee, Wis., assignor to Electronic Secretary Industries, Inc., Waukesha, Wis., a corporation of Wisconsin Application October 12, 1953, Serial No. 385,495

6 Claims. (Cl. 179—6)

This invention relates to an actuating device for telephone answering equipment employed in a party line telephone system.

Telephone answering equipment is normally connected in the telephone lines by any one of three means: (1) direct conductive connection, (2) inductive connection, or (3) acoustical connection.

For party line telephone circuits, the conventional telephone answering device which is inductively or conductively connected in the telephone circuit for actuating the device is unsatisfactory.

Party line telephone circuits normally employ a plurality of ringing currents of different frequencies. The vibrating arm in the electromagnet bell unit of each telephone is set to strike the gongs at only one of the frequencies which is different from that for any other phone on the line. Although the bell only rings at one frequency, the current of all frequencies flows in the bell winding. If the telephone answering device is inductively or conductively connected, it is actuated by all the various ringing currents.

Applicant knows of no device which solves the above difficulty other than that disclosed in the co-pending application of Joseph J. Zimmermann, filed October 12, 1953, Serial No. 385,427, and assigned to a common assignee with the present invention. Therein, a frequency sensitive relay is connected across the telephone line to actuate the answering equipment and is so designed as to respond only to a current of the frequency employed to ring the telephone it is associated with.

According to the present invention a harmonic electromagnetic vibrator is employed to actuate the device only in response to a current flow which rings the telephone it is associated with.

More specifically, the present invention employs a harmonic electromagnetic vibrator which periodically closes a switch as the arm vibrates back and forth. The switch, when closed, energizes a relay. The relay in turn controls the starting of the telephone answering device. The relay is designed with a delay on release so that its contacts remain closed during the momentary periods the vibrator contacts are open.

The drawing furnished herewith illustrates the best mode presently contemplated of carrying out the invention as set forth hereinafter.

In the drawing, there is illustrated a schematic diagram of the invention connected to a phonograph of a telephone answering device.

In general, the invention comprises a harmonic vibratory relay 1 connected in circuit across the telephone lines 2 in series with a condenser 3. The relay 1 controls the energization of relay 4 which in turn controls the energization of a telephone answering device 5.

There is connected to the telephone lines 2 a conventional telephone 6, shown as desk type having a handset 7 and a cradle base 8. The telephone 6 is connected across the telephone lines 2 through a standard line block 9.

2

Positioned within the telephone base 8 is a bell unit (not shown) comprising a winding and a hammer which strikes the bells when the winding is energized. The bell unit is designed with the vibratory stroke of the hammer such that the bells are struck only in response to a current flow of a predetermined frequency in the winding. The assigned frequency actuates only this one telephone.

The relay 1 is designed similar to the telephone bell unit with contacts 10 and 11 substituted for the bells. The winding 12 of relay 1 in series with the condenser 3 is connected across the telephone lines 2 or inductively connected thereto. Therefore, when the telephone rings, the ringing current also energizes the winding 12 which causes an arm 13 of relay 1 to vibrate and alternately make contact with the contacts 10 and 11 which are tied together as by lead 14.

As the arm 13 makes contact with either of the contacts 10 and 11, it completes an energization circuit for the slug type relay 4. The one side of the winding 15 of relay 4 is connected to the arm 13 and the other side of winding 15 is connected to a power supply 16. The other side of the power supply 16 is connected to the contacts 10 and 11, through a rectifier 17.

A condenser 18 is connected across the winding 15 of the relay 4 to insert a delay on release in the movement of contacts 19 of relay 4.

The relay contacts 19 are connected in series with the source of power 16 and a motor 20 of a phonograph 21 which is a part of the telephone answering device 5.

The telephone answering device 5 is illustrated diagrammatically with only the elements thereof necessary for a full and complete understanding of the present invention shown. The telephone answering device 5, as illustrated, is similar to that shown and described in the application of Joseph J. Zimmermann, filed April 30, 1951, Serial No. 223,730 and assigned to a common assignee with the present invention.

The telephone answering device 5 is controlled through the phonograph 21, as more fully set forth in the application referred to above.

Connected across the contacts 19 of relay 4 is a switch 22 which is mechanically closed by a movable pin 23. The pin 23 is a part of the clutch mechanism (not shown) of the phonograph 21. After a predetermined period of operation of the phonograph 21, the pin 23 moves downwardly and closes the switch 22, which completes a holding circuit around the contacts 19.

The operation of the actuating device is described as follows:

Assume the telephone 6 is connected in a party line having the ringing currents of 16⅔, 33⅓, 50 and 66⅔ cycles, respectively, and that the telephone 6 is set to ring in response to 16⅔ cycles only. The arm of relay 1 is set such that it vibrates sufficiently to effect vibratory closing of the contacts 10 and 11 in response to the 16⅔ cycles current only.

When the 16⅔ cycle current flows in the telephone lines 2, it also flows through the winding 12 and the arm 13 vibrates, alternately making contact with contacts 10 and 11. A pulsating direct current flows in the relay winding 15 which closes the contacts 19. The contacts 19 remain closed between periods of the pulsating direct current due to the action of the condenser 18. When the pulsating current flows through winding 15, the condenser 18 is charged and when the current ceases to flow, the condenser discharges through the winding. As the period between the pulsating current is small, the discharge current holds the contacts 19 closed until another surge of direct current is delivered to the condenser 18 and to the winding 15.

When the contacts 19 close, the phonograph starts to operate and after a predetermined period of time pin 23 drops sufficiently to close the switch 22 and complete the holding circuit around contacts 19. The telephone answering device then completes a cycle of operation, independently of the ringing current.

According to the present invention, the telephone is answered immediately in response only to the ringing current for the telephone.

Various modes of carrying out the invention are contemplated within the scope of the following claims particularly pointing out and distinctly claiming the subject matter which is regarded as the invention.

I claim:

1. In an actuating system for telephone answering equipment associated with a party line telephone having a normal exclusive ring current, a frequency responsive vibrator responsive only to the frequency of said normal ringing current, and connected in circuit with the telephone lines for said telephone, said vibrator having circuit making and breaking means, a source of current, electromagnetic means connected in circuit with said source of current and said circuit making and breaking means, and circuit means connecting said electromagnetic means and said telephone answering equipment to initiate actuation of the latter in response to the normal ringing current for said telephone.

2. In an actuating system for telephone answering equipment associated with a party line telephone having a normal ringing current of a frequency different than other telephones in the party line, an electromagnetic vibrator having a natural frequency of the normal ringing current and connected in said party line, said vibrator having contacts periodically closed at said natural frequency, a source of power, electromagnetic means connected in series circuit with said contacts and said source of power, said electromagnetic means being energized when said contacts close, switch means operated by said electromagnetic means and connected in circuit with the telephone answering device to initiate starting of the device.

3. In a device for actuating telephone answering equipment operably associated with a party line telephone having a ringing current of a single predetermined frequency different than the other telephones on the same party line, an electromagnetically operated vibrator having a natural frequency equal to said predetermined frequency, a condenser connected in series with a winding of said vibrator to block the flow of direct current therethrough, said series connected condenser and vibrator being connected across the party telephone line, electrical contacts disposed adjacent said vibrator and being alternately closed and opened at the natural frequency of said vibrator, a source of power, electromagnetic means connected in series circuit with said electrical contacts and a source of power, and contact means controlled by said electromagnetic means and connected in circuit with said telephone answering equipment to control actuation of said equipment.

4. Apparatus for actuating telephone answering equipment associated with a party line telephone having a normal ringing current of an exclusive frequency comprising a frequency sensitive vibrator having a natural frequency substantially the same as said exclusive frequency, a condenser connected in series with a winding of said vibrator, said series connected condenser and winding being connected across the telephone line of said telephone, electrical contacts disposed adjacent said vibrator and being alternately opened and closed by a vibrating member of said vibrator at its natural frequency, a source of direct current, a relay winding connected in series circuit with said contacts and the source of direct current, relay contacts controlled by said relay winding and being connected in circuit with said telephone answering equipment to control energization of said equipment, and means to hold said relay contacts closed when said electrical contacts are alternately opened by said vibrating member after initial closing of said electrical contacts.

5. Apparatus for actuating telephone answering equipment operably connected to a party line telephone having a normal ringing current of an exclusive frequency comprising an electromagnetic vibrator having a winding energized by normal ringing currents flowing in the party line of said telephone, said vibrator having electrical contacts alternately closed and opened in response to the normal ringing current of said exclusive frequency in said winding, a condenser connected in series circuit with said winding and said party line, a source of direct current, a relay winding connected in series circuit with said electrical contacts and the source of direct current, relay contacts disposed adjacent said relay winding and closed when said relay winding is energized, means to maintain said relay contacts closed during the periods said relay winding is momentarily de-energized, and circuit means connecting said relay contacts in circuit with said telephone answering equipment to actuate said equipment in response to the normal ringing current of said exclusive frequency.

6. In apparatus for actuating telephone answering equipment operably connected to a party line telephone having a normal ringing current of an exclusive frequency, a pair of electromagnetic windings connected in series, a condenser connected in series with said winding, said series connected windings and condenser being connected across a party line for said telephone, a vibratory member disposed between said windings and having a natural frequency equal to said exclusive frequency, a pair of connected electrical contacts disposed one to each side of said vibratory member and alternately engaged by said vibratory member when it is vibrating at its natural frequency, a relay winding having a terminal connected to said vibratory member and a second terminal connected to a source of direct current, said electrical contacts being connected to said source of power to permit current flow in said winding when said vibratory member engages the contacts, and a condenser connected across said winding and adapted to energize said winding when said vibratory member moves from one of said contacts to the other, normally open contacts disposed adjacent said relay winding and closed in response to energization of said relay winding, and said contacts being connected in series with an energization source for said telephone answering equipment to set said equipment in operation in response to the normal ringing current of said exclusive frequency flowing in the party line.

References Cited in the file of this patent

UNITED STATES PATENTS

| | | |
|---|---|---|
| 1,933,680 | Ohl | Nov. 7, 1933 |
| 2,332,359 | Van Deventer | Oct. 19, 1943 |
| 2,476,327 | Silvermaster | July 19, 1949 |